United States Patent
Ito et al.

(12)

(10) Patent No.: US 6,493,197 B2
(45) Date of Patent: Dec. 10, 2002

(54) MAGNETO-RESISTANCE EFFECT TYPE HEAD AND INFORMATION REPRODUCING APPARATUS

(75) Inventors: Junichi Ito, Kawasaki (JP); Michiaki Kanamine, Kawasaki (JP); Hitoshi Kanai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/955,358

(22) Filed: Sep. 18, 2001

(65) Prior Publication Data

US 2002/0008949 A1 Jan. 24, 2002

Related U.S. Application Data

(63) Continuation of application No. PCT/JP99/03481, filed on Jun. 29, 1999.

(51) Int. Cl.$^7$ .................................................. G11B 5/39
(52) U.S. Cl. .................................................. 360/324.12
(58) Field of Search .......................... 360/324.12, 322, 360/324.1, 327.24, 327.33

(56) References Cited

U.S. PATENT DOCUMENTS 5,923,503 A * 7/1999 Sato et al. ............. 360/324.12

FOREIGN PATENT DOCUMENTS

| JP | 5-135332 | 6/1993 |
| JP | 6-103535 | 4/1994 |
| JP | 7-182629 | 7/1995 |
| JP | 8-185612 | 7/1996 |
| JP | 8-185613 | 7/1996 |
| JP | 8-235536 | 9/1996 |
| JP | 8-315326 | 11/1996 |
| JP | 9-073611 | 3/1997 |
| JP | 10-255233 | 9/1998 |

* cited by examiner

Primary Examiner—George J. Letscher
(74) Attorney, Agent, or Firm—Greer, Burns & Crain, Ltd.

(57) ABSTRACT

The present invention provides a magneto-resistance effect type head for reproducing, with a high sensitivity, information recorded at a high recording density on a recording medium while inhibiting occurrence of the Barkhausen noise, including a magneto-resistance effect element comprised of a multi-layer film containing a free magnetic layer having its magnetization direction changing in correspondence with an external magnetic field, an insulating film, a non-magnetic underlying layer formed on the insulating film, and one pair of magnetic domain-wall control layers formed on the underlying layer in its in-face direction with a predetermined spacing therebetween, for inhibiting movement of magnetic domain wall of the free magnetic layer, in such a configuration that the free magnetic layer has its both ends directly stacked on the pair of the magnetic domain-wall control layers and also has its middle part directly stacked on the underlying layer.

8 Claims, 3 Drawing Sheets

MAGNETO-RESISTANCE EFFECT TYPE HEAD AND INFORMATION REPRODUCING APPARATUS

This is a continuation of International Application No. PCT/JP99/03481, filed Jun. 29, 1999.

FIELD OF THE INVENTION

The present invention relates to a magneto-resistance effect type head for detecting an intensity of a magnetic field based on a resistance change corresponding to this intensity and an information reproducing apparatus for reproducing information stored on a storage medium.

BACKGROUND ART

Recently, with prevalence of computers in the society, an enormous amount of information is handled daily. To store such information is there available a magnetic disk. The magnetic disk has its surface made of a magnetic material, which is divided into many minute 1-bit segments, according to a magnetization direction of each 1-bit segment the information can be stored at a high storage density. To reproduce such information is there available a hard disk drive, which has a magnetic head for detecting an intensity of a magnetic field generated by the magnetization of the magnetic disk. The magnetic head sequentially reads out a magnetization direction of each 1-bit segment of the magnetic disk to generate an electric reproduced signal corresponding to the magnetization direction, thus reproducing the information born by use of that magnetization.

The recording density of the information stored on a magnetic disk has been increasing year by year with an accompanying decrease in the area occupied by each 1-bit segment of the magnetic disk. To detect a direction of the magnetization of such a small-area 1-bit segment, it is necessary to use a reproducing magnetic head with a high sensitivity.

As the high-sensitivity reproducing magnetic head is available a magneto-resistance effect type head (hereinafter called MR head) utilizing the magneto-resistance effect of a changing resistance in correspondence with an external magnetic field, especially a spin-valve type MR head well known for its very high sensitivity. This spin-valve type MR head is comprised of a multi-layer film including a soft-magnetism free-magnetic layer which changes in orientation of magnetization corresponding to an external magnetic field, in which the resistance changes greatly with a change in that magnetization orientation. This spin-valve type MR head comes in contact or in near contact with each 1-bit segment of the magnetic disk at a read-out portion of its surface perpendicular to the multi-layer film to thereby detect a magnetic field generated by magnetization of that 1-bit segment, thus generating an electric reproduced signal based on a change in resistance corresponding to that magnetic field.

The free-magnetic layer of the multi-layer film is liable to have a magnetic domain wall occurring at the end, so that if this magnetic domain wall moves due to a change in an external magnetic field, the reproduced signal contains Barkhausen noise. To inhibit the generation of the Barkhausen noise, a magnetic domain-wall control layer made of, e.g., a hard-magnetism ferromagnetic material is arranged as one layer of the multi-layer film, so that the free magnetic layer has the magnetic domain wall fixed due to a static magnetic field and switched connection brought about by that magnetic domain-wall control layer. Although this magnetic domain-wall control layer is preferably thinned in order to realize a small read-out portion fitted to reproduction of information recorded on a magnetic disk at a high recording density, it needs to have a predetermined thickness in order to control the electric domain wall in a stable manner by applying a strong static magnetic field on the free magnetic layer. By utilizing switched connection brought about when the free magnetic layer and the magnetic domain-wall control layer come in direction contact with each other, however, it is possible to compensate for a decrease in the intensity of the static magnetic field caused by the thinning of the layer.

Conventionally, such a spin-valve type MR head with a construction having a very small junction called an abutted junction has been well known that the magnetic domain-wall control layer attached to a tapered layer cross section of the free magnetic layer. That junction has switched connection occurring thereat but can hardly preserve stable connection because it has a small junction area.

Therefore, such a construction has been worked out that is of a so-called vertical-bias underlay type, in which part of the free magnetic layer is stacked on, as covering, the magnetic domain-wall control layer directly or with an underlying layer therebetween. By this construction, when the free magnetic layer is directly stacked on the magnetic domain-wall control layer, an area of the junction between these layers is very large as compared to a junction area of the abutted junction, so that stable switched connection can be preserved always, thus effectively inhibiting the occurrence of the Barkhausen noise.

Generally, however, preferably the free magnetic layer is formed on a predetermined non-magnetic underlying layer so that the existence of the underlying layer assures good crystallinity of the free magnetic layer. Good crystallinity improves the soft-magnetization properties of the free magnetic layer, which in turn improves the sensitivity of the spin-valve type MR head.

The spin-valve type MR head having a vertical-bias underlay type construction in which this free magnetic layer is formed on one pair of magnetic domain-wall control layers with a non-magnetic underlying layer therebetween is disclosed in Japan Patent Publication Hei 10-312515. Although, in this spin-valve type MR head, the non-magnetic underlying layer weakens or eliminates the switched connection between the magnetic domain-wall control layer and the free magnetic layer, this weakness in switched connection can be compensated for by enhancing, in adjustment, the intensity of a static magnetic field of the magnetic domain-wall control layer given to the free magnetic layer.

However, the spin-valve type MR head that has such a vertical-bias underlay type construction that the free magnetic layer is formed on the non-magnetic underlying layer cannot effectuate a feature of the structure held by the spin-valve type MR head that stable switched connection can be obtained by direct junction of the magnetic domain-wall control layer and the free magnetic layer. Therefore, there is desired such a spin-valve type MR head that has good crystallinity as well as high sensitivity, and effectively inhibits the occurrence of the Barkhausen noise by utilizing the feature of the vertical-bias underlay type construction of obtaining stable switched connection between the free magnetic layer and the magnetic domain-wall control layer.

DISCLOSURE OF THE INVENTION

In view of the above, it is an object of the present invention to provide a spin-valve type magneto-resistance effect type head and information reproducing apparatus which can well reproduce information recorded on a recording medium at a high recording density while inhibiting occurrence of the Barkhausen noise.

To the above-mentioned end, a first magneto-resistance effect type head according to the present invention includes:

a magneto-resistance effect element exhibiting a change in resistance in correspondence with an intensity of an external magnetic field, to detect the magnitude of the resistance of the magneto-resistance effect element, thus detecting the intensity of the magnetic field, in such a configuration that:

the magneto-resistance effect element is comprised of a multi-layer film including a free magnetic layer which has a magnetization direction changing in correspondence with the external magnetic field, the magneto-resistance effect type head having:
an insulating layer made of an insulating material;
a non-magnetic underlying layer formed on the insulating layer; and
one pair of magnetic domain-wall control layers formed on the underlying layer in its in-face direction with a predetermined spacing therebetween, for controlling the movement of the magnetic domain wall of the free magnetic layer,
in which the free magnetic layer is formed in such a manner as to have its both ends directly stacked on the pair of the magnetic domain-wall control layers respectively and also have its middle portion directly stacked on the underlying layer.

When the free magnetic layer is directly stacked on the magnetic domain-wall control layers, switched connection occurs in a large area therebetween to effectively inhibit the movement of the magnetic domain wall of the free magnetic layer, and further, when the free magnetic later is directly stacked on the underlying layer, the free magnetic layer is improved in crystallinity, which in turn improves the soft magnetism properties. So far, however, there is provided no magnetic head having such a construction that satisfies both requirements of the free magnetic layer that effective inhibiting of the magnetic domain wall movement and improvement in the soft magnetism properties.

Since in the above-mentioned magneto-resistance effect type head, the free magnetic layer is formed in such a manner as to have its both ends directly stacked on one pair of the magnetic domain-wall control layers and have its middle portion directly stacked on the underlying layer, the movement of the magnetic domain wall of the free magnetic layer at both ends of thereof can be effectively inhibited to thereby suppress the occurrence of the Barkhausen noise in a stable manner, and further, improved soft magnetism properties can be obtained at the middle portion of the free magnetic layer to thereby detect the intensity of the magnetic field with a high sensitivity.

Furthermore, if switched connection thus occurs, the magnetic domain-wall control layer can be thinned without generating the Barkhausen noise, thus qualifying the magneto-resistance effect type head for use in the reproduction of information recorded at a high recording density on a magnetic disk.

Preferably the first magneto-resistance effect type head of the present invention has the underlying layer made of Ta.

Since the underlying layer is made of Ta, the free magnetic layer directly stacked on the underlying layer can have especially good crystallinity and so good soft magnetism properties and, moreover, a current through the above-mentioned magneto-resistance effect element is little shunted to the underlying layer made of Ta having a large specific resistance and so effectively flows to this magneto-resistance effect element, thus permitting this magneto-resistance effect type head to detect the intensity of the magnetic field at a particularly high sensitivity.

To the above-mentioned end, a second magneto-resistance effect type head according to the present invention includes:

a magneto-resistance effect element exhibiting a change in resistance in correspondence with an intensity of an external magnetic field, to detect the magnitude of the resistance of the magneto-resistance effect element, thus detecting the intensity of the magnetic field, in such a configuration that:

the magneto-resistance effect element is comprised of a multi-layer film including a free magnetic layer which has a magnetization direction changing in correspondence with the external magnetic field, the magneto-resistance effect type head having:
an insulating layer made of an insulating material;
a non-magnetic underlying layer formed on the insulating layer;
one pair of electrodes formed on the underlying layer in its in-face direction with a predetermined spacing therebetween, for flowing a current to the magneto-resistance effect element; and
one pair of magnetic domain-wall control layers stacked on one pair of the electrode respectively on the underlying layer in its in-face direction with a predetermined spacing therebetween, for controlling the movement of the magnetic domain wall of the free magnetic layer,
in which the free magnetic layer is formed in such a manner as to have its both ends directly stacked on the pair of the magnetic domain-wall control layers respectively and also have its middle portion directly stacked on the underlying layer.

Since the free magnetic layer is formed in such a manner as to have its both ends directly stacked on one pair of the magnetic domain-wall control layers and have its middle portion directly stacked on the underlying layer, like the above-mentioned first magneto-resistance effect type head, this magneto-resistance effect type head can detect the magnetic field with a high sensitivity while inhibiting occurrence of the Barkhausen noise in a stable manner, thus qualifying itself for use as a head for reproducing information recorded at a high recording density on a magnetic disk.

Further, in the construction that one pair of the magnetic domain-wall control layers are stacked on one pair of the electrode respectively on the underlying layer, the electrodes and the magnetic domain-wall control layers are formed at a high alignment accuracy by a self-alignment method, so that from this viewpoint of a high alignment accuracy in formation besides the above-mentioned thinning of the magnetic domain-wall control layers this magnetic head is suitable for reproducing the information recorded at a high recording density on a magnetic disk. Moreover, no contaminated layer is produced between the electrode and the magnetic domain-wall control layer thus formed by the self-alignment method and, a contaminated layer, if any, between the magnetic domain-wall control layer and the free magnetic layer can be eliminated by cleaning the surface of the magnetic domain-wall control layer. Since there is no such interposition of contaminated layer, the resistance between the electrode and the free magnetic layer can be reduced to easily flow a current therebetween, thus permitting this magneto-resistance effect type head to detect a magnetic field with a high sensitivity.

Preferably the second magneto-resistance effect type head of the present invention has the underlying layer made of Ta.

Since the underlying layer is made of Ta, this magneto-resistance effect type head can detect an intensity of a magnetic field with an especially high sensitivity like the first magneto-resistance effect type head likewise having the underlying layer made of Ta.

Furthermore, in the second magneto-resistance effect type head of the present invention has the above-mentioned electrode, preferably the above-mentioned electrode is made of at least one layer, having a layer made of Ta as its top layer.

Since the electrode has a Ta-made layer at its top in layer, the above-mentioned magnetic domain-wall control layer is formed on this Ta-made layer to improve the crystallinity of this magnetic domain-wall control layer, so that magnetization of the magnetic domain-wall control layer is deflected in the in-face direction of the magnetic domain-wall control layer, thus enabling further effective control on the magnetic domain wall of the free magnetic layer. The magnetic domain wall can thus be conducted effectively, to permit more stable inhibition of occurrence of the Barkhausen noise at this magneto-resistance effect type head.

Furthermore, preferably the second magneto-resistance effect type head of the present invention has the above-mentioned magnetic domain-wall control layer provided with a hard magnetic layer made of a CoPt-based alloy.

Generally, CoPt-based alloys have magnetic anisotropy and a high coersive force. The above-mentioned magnetic domain-wall control layer includes the hard magnetic layer made of a CoPt-based alloy and so has a strong static magnetic field on the free magnetic layer to thereby control the magnetic domain wall of the free magnetic layer by switched connection with the free magnetic layer, thus enabling further stable inhibition of occurrence of the Barkhausen noise at this magneto-resistance effect type head.

To the above-mentioned end, a first information reproducing apparatus according to the present invention includes:

a magnetic head arranged in contact or in near contact with a magnetic recording medium in which information is recorded by magnetization, for detecting magnetization at each point on the magnetic recording medium, to reproduce information corresponding to the magnetization detected at each point of the magnetic recording medium by the magnetic head, in such a configuration that:

the magnetic head is provided with a magneto-resistance effect element exhibiting a change in resistance in correspondence with an intensity of an external magnetic field comprised of a multi-layer film including a free magnetic layer having a magnetization direction changing in correspondence with the external magnetic field, so that the magnitude of the resistance of the magneto-resistance effect element can be detected to thereby detect the intensity of the magnetic field, the magnetic head having:

an insulating layer made of an insulating material;

a non-magnetic underlying layer formed on the insulating layer; and one pair of magnetic domain-wall control layers stacked on the underlying layer in its in-face direction with a predetermined spacing therebetween, for controlling the movement of the magnetic domain wall of the free magnetic layer, in which the free magnetic layer is formed in such a manner as to have its both ends directly stacked on the pair of the magnetic domain-wall control layers respectively and also have its middle portion directly stacked on the underlying layer.

Since in this information reproducing apparatus the magnetic head has the same construction as that of the above-mentioned first magneto-resistance effect type head, it can likewise detect an intensity of the magnetic field with a high sensitivity while inhibiting occurrence of the Barkhausen noise in a stable manner, thus qualifying this reproducing apparatus for use in reproducing the information recorded with a high recording density.

To the above-mentioned end, a second information reproducing apparatus according to the present invention includes:

a magnetic head arranged in contact or in near contact with a magnetic recording medium in which information is recorded by magnetization, for detecting magnetization at each point on the magnetic recording medium, to reproduce information corresponding to the magnetization detected at each point of the magnetic recording medium by the magnetic head, in such a configuration that:

the magnetic head is provided with a magneto-resistance effect element exhibiting a change in resistance in correspondence with an intensity of an external magnetic field comprised of a multi-layer film including a free magnetic layer having a magnetization direction changing in correspondence with the external magnetic field, so that the magnitude of the resistance of the magneto-resistance effect element can be detected to thereby detect the intensity of the magnetic field, the magnetic head having:

an insulating layer made of an insulating material;

a non-magnetic underlying layer formed on the insulating layer;

one pair of electrodes formed on the underlying layer in its in-face direction with a predetermined spacing therebetween, for flowing a current to the magneto-resistance effect element; and one pair of magnetic domain-wall control layers stacked on one pair of the electrodes respectively on the underlying layer in its in-face direction with a predetermined spacing therebetween, for controlling the movement of the magnetic domain wall of the free magnetic layer, in which the free magnetic layer is formed in such a manner as to have its both ends directly stacked on the pair of the magnetic domain-wall control layers respectively and also have its middle portion directly stacked on the underlying layer.

Since in this information reproducing apparatus the magnetic head has the same construction as that of the above-mentioned second magneto-resistance effect type head, it can likewise detect an intensity of the magnetic field with a high sensitivity while inhibiting occurrence of the Barkhausen noise in a stable manner, thus qualifying this reproducing apparatus for use in reproducing the information recorded with a high recording density.

As described above, the present invention provides a magneto-resistance effect type head and an information reproducing apparatus which can properly reproduce information recorded at a high recording density on a recording medium with a high sensitivity while inhibiting the occurrence of the Barkhausen noise.

BEST MODE FOR CARRYING OUT THE INVENTION

The following will describe embodiments of the present invention.

Figure 1:
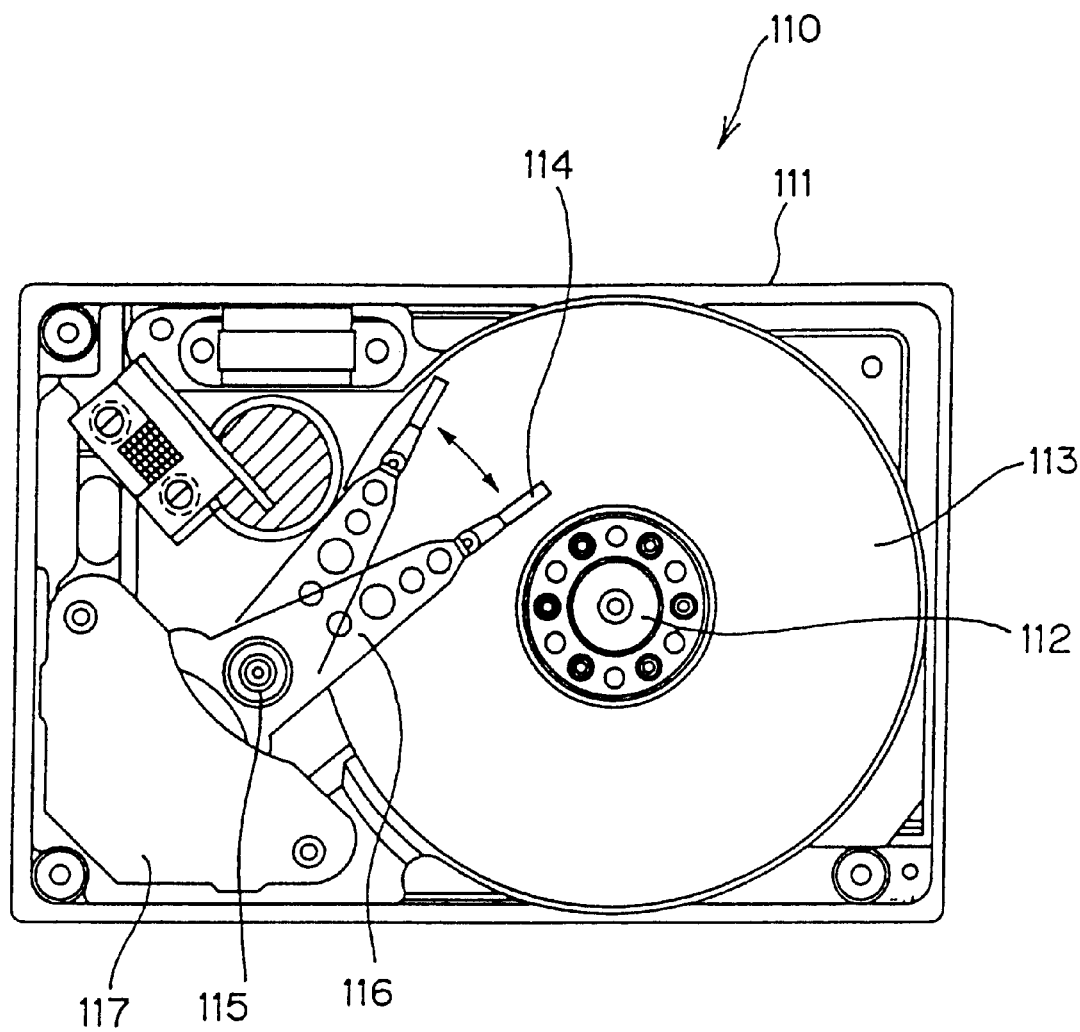
FIG. 1 is an illustration for showing an internal construction of a hard disk drive according to the present embodiment.

FIG. 1 is an illustration for showing an internal construction of a hard disk drive according to the present invention.

The hard disk drive (HDD) 110 corresponds to a first or second information reproducing apparatus according to the present invention. A housing 111 of the HDD 110 houses therein a rotary axis 112, a magnetic disk 113 mounted to the rotary axis 112, a float head slider 114 opposite the magnetic disk 113, a swinging axis 115, a carriage arm 116 swinging around the swinging axis 115 as fixed to the tip of the float head slider 114, and an actuator 117 for driving the carriage arm 116 to swing. When information recorded on the magnetic disk 113 is reproduced, the actuator 117 comprised of a magnetic circuit drives the carriage arm 116 to swing, to position the float head slider 114 at a desired track on the rotating magnetic disk 113. The float head slider 114 is mounted thereon with a magnetic head 10, not shown in FIG. 1, which corresponds to a magneto-resistance effect type head according to the present invention. The magnetic head 10 comes close sequentially to the 1-bit segments arranged in line on each track of the magnetic disk 112 as it rotates to thereby take out the information born by the magnetization of each of those 1-bit segments as an electric reproduced signal generated in correspondence with a magnetic field produced by that magnetization. The internal space of the housing 111 is enclosed with a cover not shown.

Figure 2:
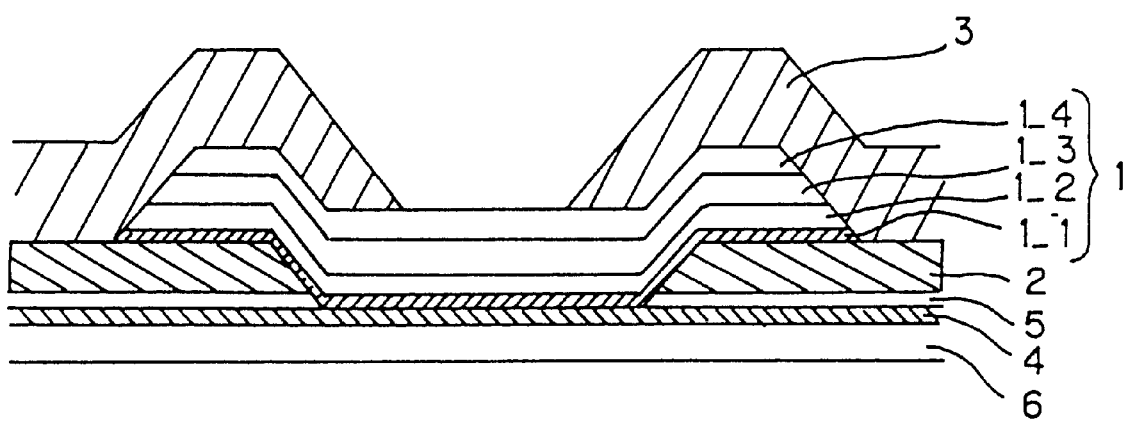
FIG. 2 is a schematic cross-sectional view for showing a first magnetic head according to the present embodiment.

FIG. 2 is a schematic cross-sectional view for showing a first magnetic head according to the present embodiment.

Specifically it shows a cross-sectional view of the first magnetic head 10_1 of the magnetic head 10 as viewed in a direction perpendicular to the face of the magnetic disk 113 shown in FIG. 1. This first magnetic head 10_1 corresponds to a magneto-resistance effect type head having a magnetic domain-wall control layer formed with no electrode sandwiched on the underlying layer. Note here that the HDD 110_1 employing the first magnetic head 10_1 corresponds to an information reproducing apparatus having a magnetic domain-wall control layer formed with no electrode sandwiched on the underlying layer according to the present invention.

The magnetic head 10_1 has a magneto-resistance effect element 1, a magnetic domain-wall control layer 2, an electrode 3, a first underlying layer 4, a second underlying layer 5, and an insulating layer 6.

The magneto-resistance effect element 1 is comprised of a free magnetic layer 1_1 formed of an underlying NiFe layer with a thickness of 20 Å and an overlying CoFeB layer with a thickness of 15 Å exhibiting soft magnetism that the magnetization direction rotates corresponding to an external magnetic field, a non-magnetic metallic layer 1_2 made of Cu with a thickness of 25 Å stacked on the right surface of the free magnetic layer 1_1, a fixed magnetic layer 1_3 made of CoFeB with a thickness of 20 Å stacked on the right surface of the non-magnetic metallic layer 1_2 and magnetized in a predetermined fixed direction, and an antiferromagnetic layer 1_4 made of PdPtMn with a thickness of 200 Å stacked on the right surface of the fixed magnetic layer 1_3 and switched-connected with the fixed magnetic layer 1_3 to thereby fix the magnetization direction of the fixed magnetic layer 1_3. The magneto-resistance effect element 1 exhibits the giant magneto-resistance effect that the resistance greatly changes corresponding to an angle between the magnetization of the fixed magnetic layer 1_3 and that of the free magnetic layer 1_1.

The first magnetic head 10_1 comes close to each of the 1-bit segments of the magnetic disk 113 on a face parallel to the cross section shown in FIG. 2, whereupon a magnetic field generated by the magnetization of each of these 1-bit segments causes the magnetization orientation of the free magnetic layer 1_1 of the magneto-resistance effect element 1 to change. Through the magneto-resistance effect element 1 is flowing a current from the electrode 3, so that when the magnetization orientation of the free magnetic layer 1_1 is thus changed to thereby change the resistance of the magneto-resistance effect element 1, the corresponding electric reproduced signal is generated to thereby reproduce the information born by the magnetization of each 1-bit segment. Note here that this first magnetic head 10_1 detects a magnetic field generated by the magnetization of the above each 1-bit segment at the center of the magneto-resistance effect element 1 extending in a lateral direction.

The magneto-resistance effect element 1 is made up of the insulating layer 6, the first underlying layer 4, the second underlying layer 5, and the magnetic domain-wall control layer 2, which are all formed on a substrate not shown.

The insulating layer 6, made of $Al_2O_3$, is formed on the substrate, for insulating from the outside, a current flowing through the magneto-resistance effect element 1.

On the insulating layer 6 is stacked the first underlying layer 4 with a thickness of 100 Å. This first underlying layer 4 corresponds to the non-magnetic underlying layer in the magneto-resistance effect element according to the present invention. As just described later, on this first underlying layer is directly stacked, at its middle portion, the free magnetic layer 1_1 of the magneto-resistance effect element 1, so that this middle portion of the free magnetic layer 1_1 has good crystallinity, thus exhibiting excellent soft magnetism properties. Moreover, since Ta has a high specific resistance, a current flowing from the electrode 3 to the magneto-resistance effect element 1 is shunted little to the first underlying layer 4 made of Ta, thus effectively flowing through the magneto-resistance effect element 1. These cause the first magnetic head 10_1 having the first underlying layer made of Ta to detect an intensity of a magnetic field with a specially high sensitivity.

On the first underlying layer 4 are formed, by a lift-off or ion milling method, the 30 Å-thick Cr-made second underlying layer 5 which consists of one lateral pair of layers formed in the in-face direction of the first underlying layer 4 with a predetermined spacing therebetween and which becomes an underlying layer for the magnetic domain-wall control layer 2 and the magnetic domain-wall control layer 2 made of a 300 Å-thick hard magnetic material of CoPt which consists of one lateral pair of layers formed in the in-face direction of the first underling layer 4 with a predetermined spacing therebetween, which applies a static magnetic field on the free magnetic layer 1_1, and which is switched-connected with the free magnetic layer 1_1 to thereby inhibit the movement of the magnetic domain wall of the free magnetic layer 1_1 in this order. Note here that the magnetic domain-wall control layer 2 may be made of an anti-ferromagnetic material besides such hard magnetic materials as CoPt and CoPtCr.

As covering these paired lateral magnetic domain-wall control layers 2 is formed the above-mentioned magneto-resistance effect element 1. Specifically, they are formed as follows. First, since a contaminated layer may be created by the above-mentioned lift-off or ion milling method on the right surface of the lateral pair of the magnetic domain-wall control layers 2, that contaminated layer must be completely removed by sputtering etching etc. for cleaning. After cleaning, subsequently a film of the magneto-resistance effect element 1 is solidly formed. Then, a resist is formed into a predetermined pattern to thereby remove part of the magneto-resistance effect element 1 thus solidly formed, by ion milling etc. By those processes, the magneto-resistance effect element 1 shown in FIG. 2 is formed.

Thus formed magneto-resistance effect element 1 is directly stacked, with the free magnetic layer 1_1 facing downward, on the magnetic domain-wall control layer 2 at its right and left ends and on the first underlying layer 4 at its middle portion between the lateral pair of the magnetic domain-wall control layers 2. Since the free magnetic layer 1_1 is directly stacked on the magnetic domain-wall control layer 2 at its right and left ends, switched connection occurs in a large area between the free magnetic layer 1_1 and the magnetic domain-wall control layer 2 to thereby inhibit the movement of the magnetic domain wall of the free magnetic layer 1_1 effectively, thus suppressing the occurrence of the Barkhausen noise at the first magnetic head 10_1 in a stable manner. Note here that preferably the layer directly stacked on the magnetic domain-wall control layer 2 of those layers constituting the free magnetic layer 1_1 is made of NiFe.

Next, the lateral pair of the electrodes 3 made of a 200–500 Å-thick Au with a predetermined spacing therebetween are formed by a lift-off method. Preferably the spacing between the lateral pair of the electrodes 3 is smaller than that between the lateral pair of the magnetic domain-wall control layers 2. Moreover, the material of the electrode 3 is not limited to Au but may be any other suitable for the electrode.

The following will describe the construction of a prior art magnetic head.

Figure 3:
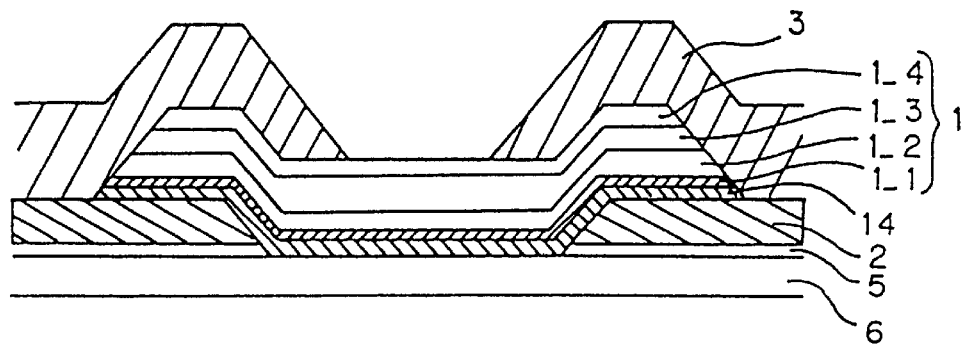
FIG. 3 is a schematic cross-sectional view for showing a prior art magnetic head.

FIG. 3 is a schematic cross-sectional view for showing the prior art magnetic head.

The prior art magnetic head 20 shown in the figure differs from the first magnetic head 10_1 according to the present embodiment in a respect that the free magnetic layer 1_1 is in contact with all the surfaces of the underlying layer 14. That is, in this prior art magnetic head 20, on the insulating layer 6 are stacked in its in-face direction the lateral pair of the second underlying layers 5 with a predetermined spacing therebetween, on which are stacked the lateral pair of the magnetic domain-wall control layers 2 respectively, so that the first underlying layer 14 is stacked on the lateral pair of the magnetic domain-wall control layers 2 and such a middle part of the insulating layer 6 that is not covered by the lateral pair of the magnetic domain-wall control layers 2, on which the first underlying layer 14 is stacked the magneto-resistance effect element 1. In addition, on this magneto-resistance effect element 1 are stacked the lateral pair of the electrodes 3 with a predetermined spacing therebetween.

Thus, in the prior art magnetic head 20, the magneto-resistance effect element 1 comes in contact with all the surfaces of the first underlying layer 14 with its free magnetic layer 1_1 facing downward. Accordingly, if the first underlying layer 14 is made of such a non-magnetic material as Ta, the free magnetic layer has good crystallinity but the free magnetic layer 1_1 and the magnetic domain-wall control layer 2 come in contact with each other little and so switched connection occurs little therebetween, so that the magnetic domain-wall control layer 2 cannot effectively control the movement of the magnetic domain wall of the free magnetic layer 1_1.

If the first underlying layer 14 is made of a ferromagnetic material, on the other hand, switched connection occurs between the free magnetic layer 1_1 and the magnetic domain-wall control layer 2, so that the magnetic domain-wall control layer 2 can effectively inhibit the movement of the magnetic domain wall of the free magnetic layer 1_1 but crystallinity of the free magnetic layer 1_1 is worse than that in the case where the underlying layer is made of such a non-magnetic material as Ta.

Thus, in the prior art magnetic head 20, good crystallinity of the free magnetic layer 1_1 cannot easily coexist with effective inhibition of the movement of the magnetic domain wall.

The first magnetic head 10_1 according to the present embodiment, however, is in contact with the first underlying layer 4 at its middle portion which detects a magnetic field and in contact with the magnetic domain-wall control layers 2 at its right and left ends which are not directly related to detection of the magnetic field, so that good crystallinity of the free magnetic layer 1_1 can coexist with effective inhibition of the movement of the magnetic domain walls. Thus, the first magnetic head 10_1 according to the present embodiment can enjoy good crystallinity of the free magnetic layer 1_1 at its middle portion which detects a magnetic field and, therefore, enjoy good soft magnetism properties to thereby reproduce information born by magnetization with a high sensitivity and also effectively control the magnetic domain walls at its right and left ends not directly related to magnetic field detection, thus suppressing occurrence of the Barkhausen noise in a stable manner.

In the magnetic head 10_1 according to the present invention, switched connection thus occurs between the magnetic domain-wall control layer 2 and the free magnetic layer 1_1 to thereby effectively inhibit the movement of the magnetic domain walls on the free magnetic layer 1_1, thus enabling suppressing occurrence of the Barkhausen noise in the above-mentioned reproduced signal even when the magnetic domain-wall control layer 2 is thin.

In the first magnetic head, the magnetic domain-wall control layer 2 is thinned and can be thinned further, thus qualifying itself for use in reproduction of information born by magnetization in a small 1-bit segment recorded at a high recording density on the magnetic disk 113.

Figure 4:
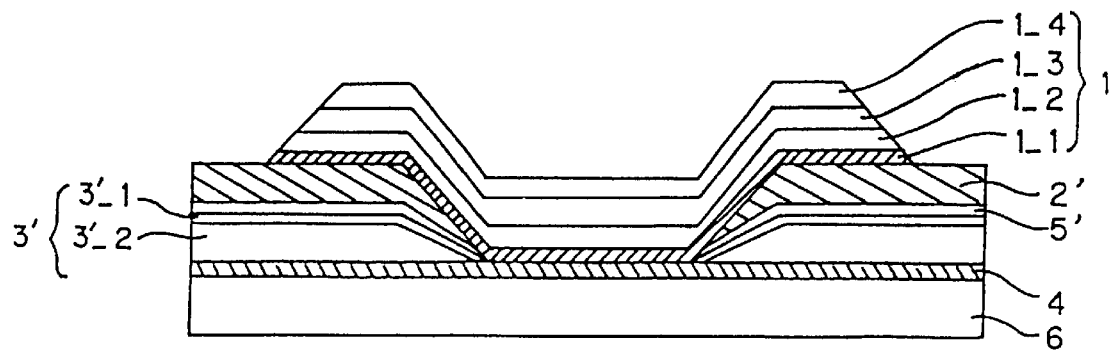
FIG. 4 is a schematic cross-sectional view for showing a second magnetic head according to the present embodiment.

FIG. 4 is a schematic cross-sectional view for showing a second magnetic head according to the present embodiment.

Specifically, this figure shows a cross section of the second magnetic head 10_2 of the magnetic head 10 as viewed in a direction perpendicular to the face of the magnetic disk 113 shown in FIG. 1. This second magnetic head 10_2 corresponds to the magneto-resistance effect type head equipped with electrodes according to the present invention. Note here that an HDD 110_2 employing the second magnetic head 10_2 corresponds to the information reproducing apparatus equipped with electrodes according to the present invention.

The second magnetic head 10_2 according to the present embodiment shown in the figure differs from the first magnetic head 10_1 of the present embodiment in a respect of arrangement in the electrodes. That is, in this second magnetic head 10_2, on the insulating layer 6 is stacked the first underlying layer 4, on which first underlying layer 4 are stacked in its in-face direction a lateral pair of electrodes 3' with a predetermined spacing therebetween. On this lateral pair of the electrodes 3' are stacked respectively a lateral pair of second underlying layers 5' with a predetermined spacing therebetween in the in-face direction of the first underlying layer 4 likewise and then stacked the lateral pair of the magnetic domain-wall control layers 2 with a predetermined spacing therebetween in the in-face direction of the underlying layer 4 in this order. On the lateral pair of the magnetic domain-wall control layers 2' and a surface of the first underlying layer 4 exposed between the lateral pair of the magnetic domain-wall control layers 2' is stacked the magneto-resistance effect element 1 with the free magnetic layer 1_1 facing downward. Note here that except for the electrode 3', the material and the thickness of these layers are all the same as those of the first magnetic head 10_1 of the present embodiment.

Since the free magnetic layer 1_1 is directly stacked on the lateral pair of the magnetic domain-wall control layers 2' at its both ends and is directly stacked at its middle portion on the underlying layer 4, in this second magnetic head 10_2, good crystallinity of the free magnetic layer 1_1 and effective inhibition of the movement of the magnetic domain walls can coexist with each other, like the above-mentioned first magnetic head 10_1. Accordingly, the second magnetic head can inhibit occurrence of the Barkhausen noise in a stable manner and also detect a magnetic field with a high sensitivity, thus qualifying itself for use in reproduction of information recorded at a high recording density on the magnetic disk 113.

The electrodes 3' of this second magnetic head 10_2 is obtained by forming, by use of the lift-off or ion milling method, on the first underlying layer 4, the lateral pair of the electrodes 3 and, thereon, the lateral pair of the second underlying layers 5' made of Cr and also, thereon, the lateral pair of the magnetic domain-wall control layers 2' made of CoPt. Those three lateral pairs of layers are all formed with the respective predetermined spacing therebetween in the in-face direction of the first underlying layer 4.

The electrode 3' is comprised of a Au layer 3'_2, not shown, with a thickness of 200–500 Å and an overlying Ta layer 3'_1 with a thickness of 100 Å on the Au layer. The Ta layer 3'_1 has a role of acting as an adhesive or protecting layer as well as a role of inhibiting the influence of Au having a face-centered cubic lattice to thereby provide good in-face deflection of crystal of the magnetic domain-wall control layers 2' formed on the Ta layer 3'_1. This good in-face deflection further effectuates the controlling of the magnetic domain walls of the free magnetic layer 1_1, thus suppressing occurrence of the Barkhausen noise in a more stable manner in the second magnetic head 10_2. Note here that the Au layer 3'_2 may be made of Ru or Cu in place of Au.

Furthermore, if the magnetic domain-wall control layer 2' is formed by the lift-off method, the top surface of the magnetic domain-wall control layers 2' is cleaned to completely remove the contaminated layers by sputter etching to then form the magneto-resistance effect element layer 1.

In this construction of this second magnetic head 10_2 that the pair of the magnetic domain-wall control layers 2' are stacked respectively in formation on the pair of the electrodes 3' on the first underlying layer 4, the electrode 3' and the magnetic domain-wall control layer 2' can be formed with a high alignment accuracy by self-alignment method. This second magnetic head 10_2 is suitable for reproducing information recorded at a high recording density on the magnetic disk 113 also from a viewpoint of this formation at a high alignment accuracy besides a viewpoint of thinning of the magnetic domain-wall control layers 2'. Moreover, by thus forming the electrode 3' and the magnetic domain-wall control layer 2' by self-alignment method, no contaminated layer is produced between them and, further by the above-mentioned cleaning of the top surface of the magnetic domain-wall control layer 2', a contaminated layer can be removed between the magnetic domain-wall control layer 2' and the free magnetic layer 1_1, the resistance between the electrode 3' and the free magnetic layer 1_1 can be reduced to thereby easily flow a current therebetween, thus permitting this second magnetic head 10_2 to detect a magnetic field with a high sensitivity.

Note here that in the second magnetic head 10_2 also, preferably the first underlying layer 4 is made of Ta like the first magnetic head 10_1.

Furthermore, the CoPt-based alloys have magnetic anisotropy and a high coercive force. If the magnetic domain-wall control layer 2' has a hard magnetic layer made of a CoPt-based alloy, the magnetic domain-wall control layer has strong static magnetic field on the free magnetic layer and switched connection to thereby effectively control the magnetic domain wall of the free magnetic layer, thus enabling suppressing occurrence of the Barkhausen noise at the second magnetic head.

What is claimed is:

1. A magneto-resistance effect type head equipped with a magneto-resistance effect element exhibiting a resistance change in correspondence with an intensity of an external magnetic field, for detecting a value of a resistance of said magneto-resistance effect element to thereby detect said intensity of magnetic field, said magneto-resistance effect element comprised of a multi-layer film containing a free magnetic layer having magnetization direction changing in correspondence with an external magnetic field, said head comprising:

an insulating layer made of an insulating material;

a non-magnetic underlying layer formed on said insulating layer; and one pair of magnetic domain-wall control layers formed on said underlying layer in an in-face direction thereof with a predetermined spacing therebetween, for controlling movement of a magnetic domain wall of said free magnetic layer, wherein said free magnetic layer is formed in such a manner as to have both ends thereof stacked directly on said pair of magnetic domain-wall control layers respectively and to have a middle portion thereof stacked directly on said underlying layer.

2. The magneto-resistance effect type head according to claim 1, wherein said underlying layer is made of Ta.

3. A magneto-resistance effect type head equipped with a magneto-resistance effect element exhibiting a resistance change in correspondence with an intensity of an external magnetic field, for detecting a value of a resistance of said magneto-resistance effect element to thereby detect said intensity of magnetic field, said magneto-resistance effect element comprised of a multi-layer film containing a free magnetic layer having magnetization direction changing in correspondence with an external magnetic field, said head comprising:

an insulating layer made of an insulating material;

a non-magnetic underlying layer formed on said insulating layer;

one pair of electrodes formed on said underlying layer in an in-face direction thereof with a predetermined spacing therebetween; and one pair of magnetic domain-wall control layers stacked, in formation, respectively on said pair of electrodes on said underlying layer in an in-face direction thereof with a predetermined spacing therebetween, for controlling movement of a magnetic domain wall of said free magnetic layer, wherein said free magnetic layer is formed in such a manner as to have both ends thereof stacked directly on said pair of magnetic domain-wall control layers respectively and to have a middle portion thereof stacked directly on said underlying layer.

4. The magneto-resistance effect type head according to claim 3, wherein said underlying layer is made of Ta.

5. The magneto-resistance effect type head according to claim 3, wherein said electrode has as a top layer thereof at least one layer including a layer made of Ta.

6. The magneto-resistance effect type head according to claim 3, wherein said magnetic domain-wall control layer includes a hard magnetic layer made of a CoPt-based alloy.

7. An information reproducing apparatus equipped with a magnetic head which is arranged in contact or in near contact with a magnetic recording medium on which information is recorded by magnetization to thereby detect magnetization at each point on said magnetic recording medium, for reproducing information in correspondence with magnetization detected by said magnetic head at each point on said magnetic recording medium, wherein:

said magnetic head is equipped with a magneto-resistance effect element which is comprised of a multi-layer film containing a free magnetic layer having a magnetization direction changing in correspondence with an external magnetic field and also which exhibits a resistance change in correspondence with an intensity of an external magnetic field, for detecting a value of a resistance of said magneto-resistance effect element to thereby detect said intensity of magnetic field, said magnetic head comprising:

an insulating layer made of an insulating material;

a non-magnetic underlying layer formed on said insulating layer; and one pair of magnetic domain-wall control layers formed on said underlying layer in an in-face direction thereof with a predetermined spacing therebetween, for controlling movement of a magnetic domain wall of said free magnetic layer; and said free magnetic layer is formed in such a manner as to have both ends thereof stacked directly on said pair of magnetic domain-wall control layers respectively and to have a middle portion thereof stacked directly on said underlying layer.

8. An information reproducing apparatus equipped with a magnetic head which is arranged in contact or in near contact with a magnetic recording medium on which information is recorded by magnetization to thereby detect magnetization at each point on said magnetic recording medium, for reproducing information in correspondence with magnetization detected by said magnetic head at each point on said magnetic recording medium, wherein:

said magnetic head is equipped with a magneto-resistance effect element which is comprised of a multi-layer film containing a free magnetic layer having a magnetization direction changing in correspondence with an external magnetic field and also which exhibits a resistance change in correspondence with an intensity of an external magnetic field, for detecting a value of a resistance of said magneto-resistance effect element to thereby detect said intensity of magnetic field, said magnetic head comprising:

an insulating layer made of an insulating material;

a non-magnetic underlying layer formed on said insulating layer;

one pair of electrodes formed on said underlying layer in an in-face direction thereof with a predetermined spacing therebetween, for flowing a current to said magneto-resistance effect element; and one pair of magnetic domain-wall control layers stacked, in formation, respectively on said pair of electrodes on said underlying layer in an in-face direction thereof with a predetermined spacing therebetween, for controlling movement of a magnetic domain wall of said free magnetic layer; and said free magnetic layer is formed in such a manner as to have both ends thereof stacked directly on said pair of magnetic domain-wall control layers respectively and to have a middle portion thereof stacked directly on said underlying layer.

* * * * *

UNITED STATES PATENT AND TRADEMARK OFFICE
CERTIFICATE OF CORRECTION

PATENT NO. : 6,493,197 B2  Page 1 of 1
DATED : December 10, 2002
INVENTOR(S) : Ito et al.

It is certified that error appears in the above-identified patent and that said Letters Patent is hereby corrected as shown below:

<u>Title page, Item [54] and Column 1, lines 1-3,</u>
Title, should read as follows:

-- VERTICAL-BIAS UNDERLAY AND MAGNETO-RESISTANCE EFFECT TYPE HEAD --

Signed and Sealed this

Twenty-seventh Day of May, 2003

JAMES E. ROGAN
*Director of the United States Patent and Trademark Office*